E197A XR 3,767,846

United States Patent [19]

Okubo 3,767,846

[45] Oct. 23, 1973

[54] AUXILIARY ILLUMINATION DEVICE FOR UNIFORM ILLUMINATION OF A LIGHT RECEIVING SURFACE OF THE PICK-UP TUBE FOR COLOR TELEVISION

[75] Inventor: Masami Okubo, Tokyo, Japan

[73] Assignee: Canon Kabushiki Kaisha, Tokyo, Japan

[22] Filed: Dec. 16, 1970

[21] Appl. No.: 98,489

[30] Foreign Application Priority Data

Dec. 25, 1969 Japan 44/104512

[52] U.S. Cl. 178/5.4 ST, 178/7.2, 178/DIG. 2

[51] Int. Cl. H04n 9/06

[58] Field of Search 240/1 R, 1 EL; 350/168; 178/DIG. 2, 7.85, 7.87, 5.4 ST

[56] References Cited

UNITED STATES PATENTS

| | | | |
|---|---|---|---|
| 3,668,304 | 6/1972 | Ellenberger | 178/5.4 ST |
| 3,610,818 | 10/1971 | Bachmann | 350/172 X |
| 3,632,873 | 1/1972 | Henken | 178/7.85 |
| 3,506,782 | 4/1970 | Anwyl | 178/7.87 |
| 2,779,938 | 1/1957 | Pifer | 240/1 R X |
| 3,535,018 | 10/1970 | Vasilatos | 240/1 R X |
| 3,273,445 | 9/1966 | Siegmund | 178/DIG. 2 |
| 1,876,806 | 9/1932 | Waide | 350/168 |
| 1,412,675 | 4/1922 | Collins | 350/168 X |

OTHER PUBLICATIONS

Publ. "Piping Light With Acrylic Materials" by Henry Pearson. Modern Plastics, Aug. 1946. Pg. 123–128.

*Primary Examiner*—Richard C. Queisser
*Assistant Examiner*—Daniel M. Yasich
*Attorney*—McGlew and Toren

[57] ABSTRACT

In the apparatus disclosed, a clad rod is positioned in front of the light receiving surface of a dichroic mirror system, which is in turn placed in front of the pick-up tube. The clad rod is composed of transparent material having a relatively high refractive index. It is clad with a thin transparent material having a relatively low refractive index. Part of the clad rod is provided with a light diffusing roughened surface. Light is directed toward one end of the clad rod by a light source.

11 Claims, 5 Drawing Figures

FIG. 1
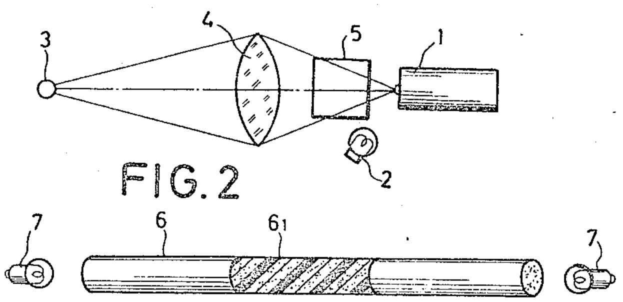
FIG. 1, FIG. 2
FIG. 3
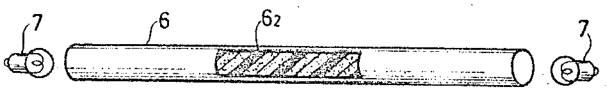
FIG. 4
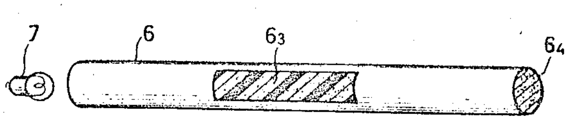
FIG. 5
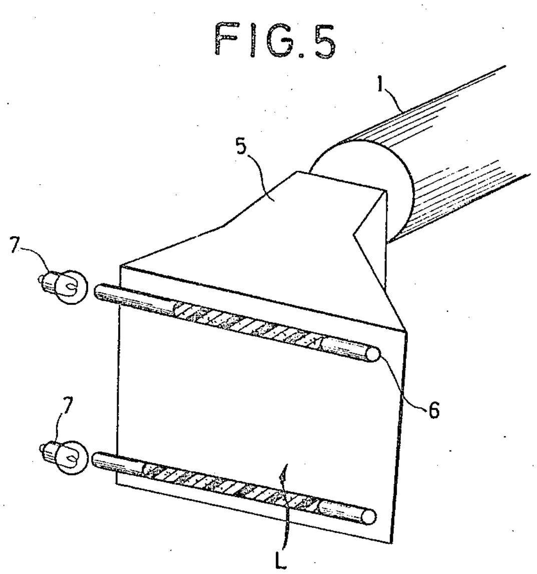
INVENTOR.
MASAMI OKUBO
BY
McGlew and Toren
ATTORNEYS

AUXILIARY ILLUMINATION DEVICE FOR UNIFORM ILLUMINATION OF A LIGHT RECEIVING SURFACE OF THE PICK-UP TUBE FOR COLOR TELEVISION

This invention relates to color television broadcasting and particularly to auxiliary illuminating equipment for color television pick-up tubes.

The invention is described with reference to the accompanying drawings in which:

FIG. 1 is an explanatory drawing of the purpose of the present invention;

FIGS. 2, 3 and 4 are respective embodiments of the clad rod according to features of the present invention;

FIG. 5 is an drawing of an embodiment of the present invention.

In color television broadcasting, color distortion shadings or after-images may occur when the subject being photographed is comparatively dim or moves rapidly. This is often due to the fact that the rise-time response and afterimage characteristic of a pick-up tube vary in dependence upon the color being transmitted. This afterimage can be eliminated by using a light source to furnish the light receiving surface of a pick-up tube 1 with low illuminance auxiliary illumination. However, it is necessary to make sure that the receiving surface of the pick-up tube 1 be lit up almost uniformly. Generally, it is quite difficult to obtain uniform illumination with auxiliary lighting equipment 2 within the limited space of a color beam splitting system.

As shown in FIG. 1, the pick-up tube 1 receives light from an object 3 through a lens 4 and a dichroic mirror 5.

An object of the invention is to improve color television broadcasting equipment.

Another object of the invention is to eliminate the aforementioned difficulty.

Another object of the invention is to avoid such distortion with equipment that can be mounted in a very narrow space and can nevertheless illuminate the light receiving surface of the pick-up tube uniformly.

Below the present invention is explained in detail, with clad rods as an example, according to the drawing.

FIGS. 2, 3 and 4 show respectively a clad rod. FIG. 2 shows a clad rod 6, a part of which $6_1$ is circumferentially rough ground. The rod is clad with a material whose index of refraction is less than the index of refraction of the rod itself. The rod itself, i.e. the core is made of glass or acrylic resins. The clad rod 6 is ground a little deeper down the surface of its core to form an elongated recess. At one end or both ends of clad rod 6 a lamp 7 or some other lighting eqipment is mounted and the light flux is directed into the clad rod, diffused on the roughened surface, which surface is thereby brightened so as to serve as secondary light source. In FIG. 3, a part $6_2$ of a circumference at a part of the clad rod 6 is roughened. As is the case with FIG. 2 the roughed surface is brightened. In case of FIG. 3 seen from the back of the figure due to the lens effect of the clad rod 6 the light going to the back of the paper is converged and the clad rod becomes an efficient light source. When the roughened surface $6_3$ is painted with white dispersing paint, it becomes more efficient and bright light source toward the back of the paper. FIG. 4 shows a clad rod 6 whose one end $6_4$ is spattered with silver or aluminium in contrast with those in FIG. 2 and FIG. 3. In case of those in FIGS. 2 and 3 the light led from the one end in the clad rod 6 passes out at the other end. In case the one end is spattered with some proper material, the effect of two lamps can be obtained from only one lamp.

Thus roughening a clad rod of any dimension, a light source large enough to meet this purpose can be obtained. One or several clad rods is or are arranged at a position or positions in color beam splitting system 20 that the light flux to make the object image should not be disturbed and that the light receiving surface or pick-up tube could be illuminated equally. Further FIGS. 2, 3 and 4 show respectively a straight clad rod. However so far as the efficiency of the clad rod is not decreased, any form of clad rod can be applied. FIG. 5 shows an embodiment of the present invention. Here, the clad rod 6 is mounted in front of dichroic mirror 5. The arrow (L) in the drawing shows the direction of the object image light. Two rods 6 extend horizontally near the top and bottom of the entrance face of the dichroic mirror 5. Surfaces facing away from the entrance face have recesses which are roughened. Those roughened recesses disperse the light and some of the dispersed light travels through the cladding toward the entrance face.

What is claimed is:

1. An auxiliary illuminating apparatus for a pick-up tube of a color television system, comprising a clad rod, dichroic mirror means having a light receiving surface and positioned in front of the pick-up tube, said clad rod being positioned in front of said light receiving surface of said dichroic mirror means, said clad rod being composed of transparent material having a first refractive index and clad with thin transparent material having a refractive index substantially lower than the first refractive index, a portion of said clad rod being provided with a light diffusing roughened surface, and a light source directing light toward one end of the clad rod, said clad rod being positioned parallel to the light receiving surface with the roughened surface being positioned to cause light to be directed toward said receiving surface.

2. An apparatus as in claim 1, wherein a second clad rod corresponding to said first clad rod is positioned in front of the light receiving surface of said dichroic mirror means, and a second light source for directing light to an end of said second clad rod.

3. An apparatus as in claim 2, wherein said rods are positioned parallel to said light receiving surface of said dichroic mirror means.

4. An apparatus as in claim 1, wherein said roughened surface faces away from the light receiving surface of said dichroic mirror means.

5. An apparatus as in claim 1, wherein the portion of the clad rod within the thin transparent material is composed of one of the materials selected from the group consisting of glass and acrylic acid resin.

6. An auxiliary illuminating apparatus for a pick-up tube of a color television system, comprising dichroic mirror means having a light entry surface and positioned in front of the light receiving surface of said pick-up tube, elongated clad rod means positioned in front of the light entry surface of said dichroic mirror means, said clad rod means including a core rod composed of transparent material having a first refractive index, said clad rod means including a thin transparent cladding on said core rod, said cladding having a second refractive index substantially lower than the first refractive index, said rod means forming an elongated recess passing through said cladding and a portion of said core rod, said core rod and said cladding having roughened surfaces at said recess, and a light source positioned near the end of said clad rod means and directing light toward one end of the clad rod means, said clad rod means being positioned parallel to the light entry surface with the roughened recess being positioned to cause travel of light toward said entry surface.

7. An apparatus as in claim 6, wherein said recess is comparatively elongated.

8. An apparatus as in claim 6, wherein said rod in said cladding is substantially cylindrical and said cladding covers substantially all the cylindrical surface of said rod except at said recess.

9. An apparatus as in claim 8, wherein said recess is comparatively elongated.

10. An auxiliary illuminating apparatus for uniformly illuminating the light receiving surface of a pick-up tube of a color television system, comprising dichroic mirror means having a light entry surface and positioned in front of the light receiving surface of said pick-up tube, elongated clad rod means positioned in front of the light entry surface of said dichroic mirror means, said clad rod means including a core rod composed of transparent material having a first refractive index, said clad rod means including a thin transparent cladding on said core rod, said cladding having a second refractive index substantially lower than the first refractive index, said rod means forming an elongated recess passing through said cladding and a portion of said core rod, said core rod and said cladding having roughened surfaces at said recess, and a light source positioned near the end of said clad rod means and directing light toward one end of the clad rod means, further comprising second clad rod means substantially identical to said first clad rod means and positioned in front of the light entry surface of said dichroic mirror means, and a second light source for directing light at the end of said second clad rod means.

11. An auxiliary illuminating apparatus for uniformly illuminating the light receiving surface of a pick-up tube of a color television system, comprising dichroic mirror means having a light entry surface and positioned in front of the light receiving surface and said pick-up tube, elongated clad rod means positioned in front of the light entry surface of said dichroic mirror means, said clad rod means including a core rod composed of transparent material having a first refractive index, said clad rod means including a thin transparent cladding on said core rod, said cladding having a second refractive index substantially lower than the first refractive index, said rod means forming an elongated recess passing through said cladding and a portion of said core rod, said core rod and said cladding having roughened surfaces at said recess, and a light source positioned near the end of said clad rod means and directing light toward one end of the clad rod means, wherein said clad rod means are positioned parallel to the light entry surface with the roughened recess facing away from the light entry surface.

* * * * *